July 19, 1949.  E. O. SCHEERER ET AL  2,476,918
MECHANICAL SPOTTING MACHINE HAVING TWO ROTATING
DISKS WITH ALIGNABLE VIEWING OPENINGS
Filed Dec. 28, 1946  2 Sheets-Sheet 1

INVENTORS
ERNEST OTTO SCHEERER
FREDERICK HERMAN GUBER JR.
BY
J. Ledermann
ATTORNEY

INVENTORS
ERNEST OTTO SCHEERER
FREDERICK HERMAN GUBER JR.
BY
ATTORNEY

Patented July 19, 1949

2,476,918

UNITED STATES PATENT OFFICE 2,476,918

MECHANICAL SPOTTING MACHINE HAVING TWO ROTATING DISKS WITH ALIGNABLE VIEWING OPENINGS

Ernest Otto Scheerer, Linden, and Frederick Herman Guber, Jr., Roselle, N. J.

Application December 28, 1946, Serial No. 718,958

3 Claims. (Cl. 88—14)

This invention relates to machines adapted to permit of a stationary view of any reciprocating, oscillating, or rotating part or segment which is in motion at any rate of speed, and the main object thereof is the provision of a novel, practical and useful machine which is simple in operation and construction and inexpensive in cost of manufacture. By means of such a machine a stationary view of any rapidly rotating part, such as, by way of example, the segment of the commutator of a motor or generator, may be viewed without having to stop or slow down the electric machine.

The above broad as well as additional and more specific objects will become apparent in the following description, wherein characters of reference refer to like-numbered parts in the accompanying drawings. It is to be noted that the drawings are intended for the purpose of illustration only, and that it is neither desired nor intended to limit the invention necessarily to any or all of the exact details of construction shown except insofar as they may be deemed essential to the invention.

Referring briefly to the drawing, Fig. 1 is a plan view of the mechanical spotting machine.

Figure 1:
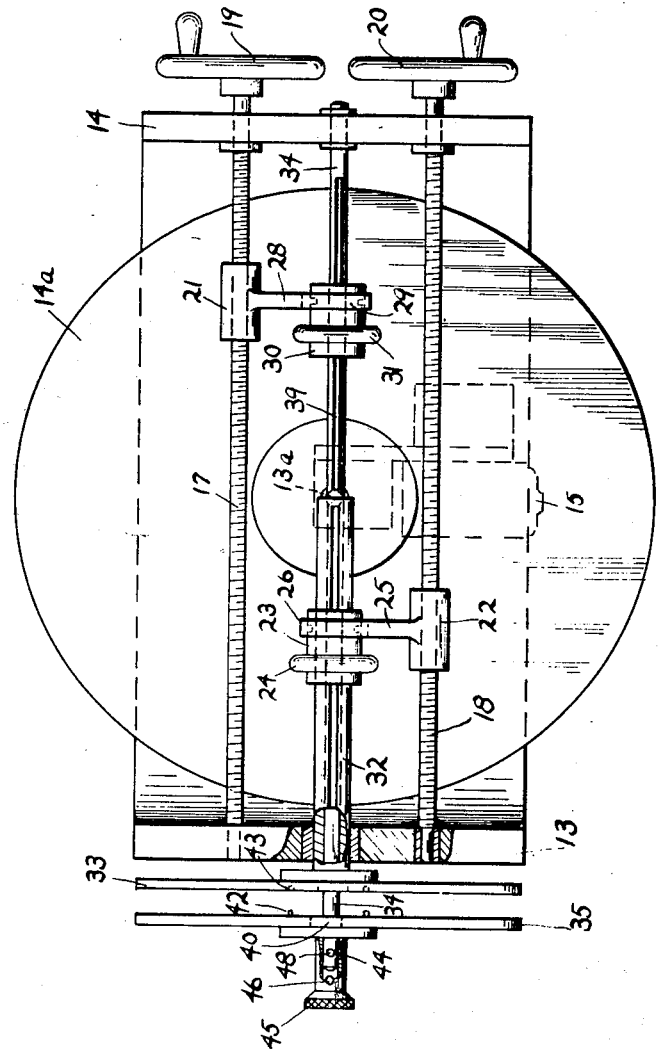
Figure 2:
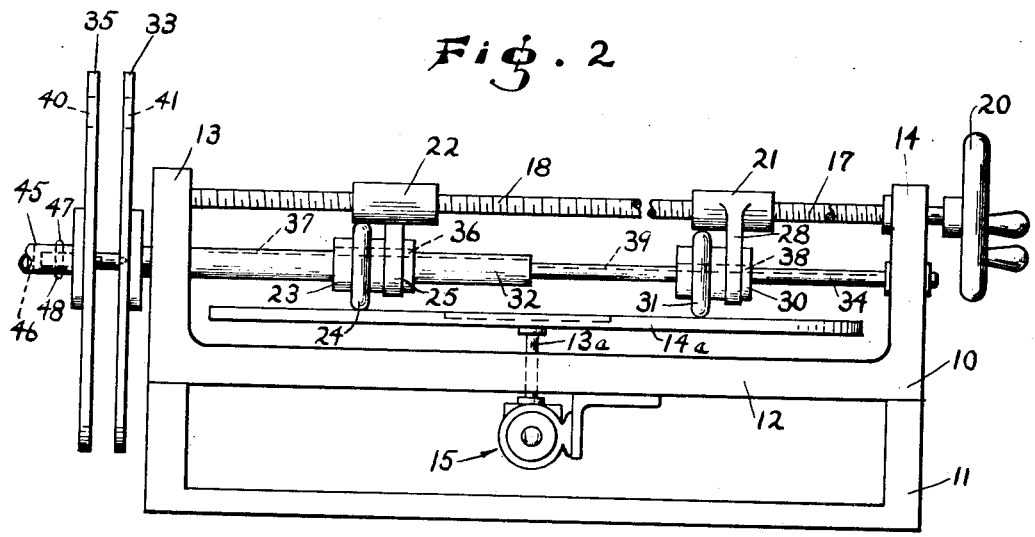
Fig. 2 is a side elevational view of the same.
Figure 3:
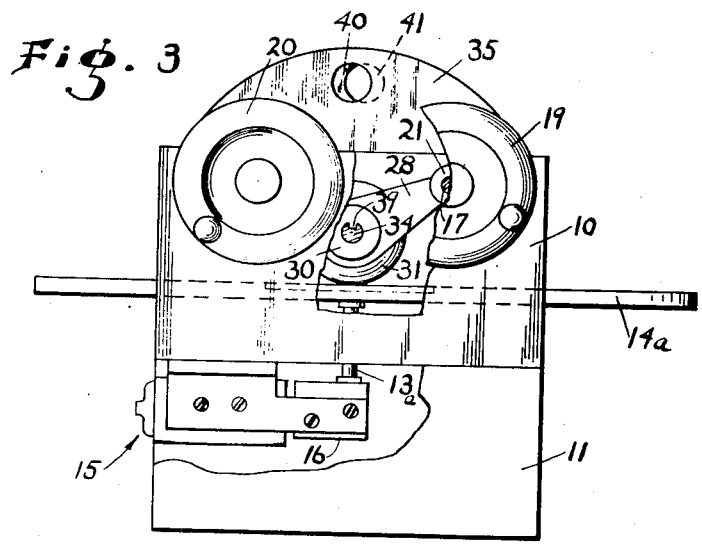
Fig. 3 is an end elevational view of the same.

Referring in detail to the drawings, the numeral 10 indicates a frame which may be supported on a base 11, and includes the lower horizontal plate 12 and two upright parallel end walls 13 and 14 extending from the plate 12. A vertical shaft 13a extending rotatably through the plate 12, supports and is adapted to rotate a horizontal disc 14a.

An electric motor 15 is supported under the plate 12 and, through the medium of reduction gears contained in the housing 16, drives the shaft 13a and hence the disc 14a.

Rotatably supported in the end walls 13 and 14 and lying in a common horizontal plane, are a pair of worms 17 and 18, which are adapted to be rotated by cranks 19 and 20, respectively. These worms pass through internally threaded riders 21 and 22, respectively, which they are thus adapted to move in either direction along the worms upon rotation of the respective cranks 19 and 20. By means of an arm 25 extending from the rider 22, a sleeve 23 is coupled to this rider, and this sleeve has a friction wheel 24 rigid therewith in the nature of a flange. The arm 25 has a ring bearing 26 on its end, in which the sleeve 23 is rotatably locked so that the sleeve and wheel 24 will move longitudinally with the rider 22. Likewise, the rider 21 has an arm 28 provided with a ring bearing 29 on its end, in which a sleeve 30 having a similar friction wheel 31 thereon, is rotatably locked.

Rotatably mounted in the end wall 13 is a hollow shaft 32, and a vertical disc 33 is rigid on the outer end thereof. In axial alignment with the shaft 32, a solid shaft 34 is rotatably mounted in the end wall 14. The other end of the shaft 34 registers rotatably in and passes entirely through the hollow shaft 32 and through the disc 33, and on the outer end thereof a disc 35 is slidably mounted. A key 36 registering slidably in a keyway 37 in the hollow shaft 32, permits longitudinal movement of the sleeve 23 along the shaft 32 but causes them both to rotate together. Likewise, a key 38 in the sleeve 30 registers slidably in a keyway 39 in the shaft 34 so that the sleeve 30 is slidably on the shaft 34 but both the key and the shaft rotate together.

The friction wheels are in contact with the upper surface of the horizontal disc 14a and are hence actuated by the latter, the speed of rotation of each wheel 24 or 31 being determined by the distance of the wheel from the center of the disc 14a. The discs 33 and 35 are provided with any number of concentric holes or openings therethrough; in the drawings, the disc 35 is shown with a single hole 40 therethrough, and the disc 33 with a single hole 41 therethrough. Spaced pins 42 extend rearward from the disc 35 and are adapted to register in similarly spaced recesses 43 in the disc 33 when it is desired to lock these discs together so that they rotate in unison.

The free end of the protruding shaft 34 is provided with an opening or recess 44 diametrically thereinto or therethrough. A tubular cap 45 is slidably mounted on the end of this shaft, and is provided with longitudinally spaced openings 46 and 47 through one wall thereof. A pin 48, which may be of any desired form, is slidably mountable in the opening 44 in alignment with either of the holes 46 or 47, whereby the cap 45 may be locked to the shaft 34 in either the position shown in Fig. 1, or, not shown, in pushed-in position with the two discs 33 and 35 locked together by means of the pins 42 as stated above.

When it is desired to view a part of a rotating or rapidly moving machine, such as, for example, the segment of a dynamo commutator, the device is suitably positioned so that one may look through the openings 40, 41 at the part, in the following manner. The electric motor 15, is energized, thus rotating the disc 14a and, consequently, rotating both friction wheels 24 and 31 at different speeds. The speeds of the two friction wheels and hence of the viewing discs 33 and 35 are varied by means of the crank wheels 19 and 20 until the difference in speeds between these two discs is such that once during a given number of turns of the commutator the two openings 40 and 41 will be aligned and in line with the eye of the viewer. The proper synchronism to obtain this condition is simply a matter of suitable adjustment of the longitudinal positions of the friction wheels until the desired condition is obtained. Many variations are, of course, possible, so that the frequency of the alignment of the two view holes 40, 41 with the object being viewed, may be varied as desired.

Obviously, modifications in form and structure may be made without departing from the spirit or scope of the invention.

We claim:

1. A device of the class described comprising a frame having a longitudinal cross member and upright end members, a vertical shaft rotatably mounted in said cross member and an electric motor for driving the same, a horizontal disc rigid on the upper end of said shaft, a pair of spaced worms lying in a substantially horizontal plane and rotatably mounted in said end members above said disc, means for selectively rotating said worms, riders on said worms, a hollow shaft rotatably mounted in one of said end members and extending therethrough and extending at one end to a point substantially above and spaced from the center of said disc, a solid shaft rotatably mounted in the other of said end members coaxially with said hollow shaft and having one end thereof passing entirely through said hollow shaft, a viewing disc on the outer end of said hollow shaft, a viewing disc on the outer end of said solid shaft spaced from said first viewing disc, said viewing discs having concentric view holes therethrough, an arm extending from one of said riders, a sleeve rotatably mounted in the end of said arm and keyed to said hollow shaft, a friction wheel rigid on said sleeve in contact with said horizontal disc, an arm extending from said other rider, a sleeve rotatably mounted in said second arm and keyed to said solid shaft, said second sleeve having a friction wheel rigid thereon in contact with said horizontal disc.

2. The device set forth in claim 1, said second viewing disc being slidable on said solid shaft, and means for locking said second viewing disc in any of a plurality of positions on said solid shaft.

3. The device set forth in claim 1, said second viewing disc being slidable on said solid shaft, and means for releasably locking said second viewing disc against said first viewing disc.

ERNEST OTTO SCHEERER.
FREDERICK HERMAN GUBER, Jr.

REFERENCES CITED

The following references are of record in the file of this patent:

UNITED STATES PATENTS

| Number | Name | Date |
| --- | --- | --- |
| 852,719 | Hesketh | May 7, 1907 |
| 1,636,995 | Hanson | July 26, 1927 |
| 1,835,240 | Rollings | Dec. 8, 1931 |